3,173,928
S-(10-PHENOXARSINYL) TETRAHYDRO-
FURFURYL XANTHATE
Stanley J. Strycker, Midland, Mich., assignor to The Dow
Chemical Company, Midland, Mich., a corporation of
Delaware
No Drawing. Filed Oct. 29, 1962, Ser. No. 233,906
1 Claim. (Cl. 260—347.2)

This invention is directed to S-(10-phenoxarsinyl) tetrahydrofurfuryl xanthate corresponding to the formula:

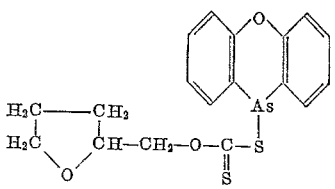

This compound is a crystalline solid material which is somewhat soluble in a number of common organic solvents and of very low solubility in water. The compound is useful as a parasiticide for the control of a number of parasite species such as worms, flies, beetles and aphids. The compound is also useful for the modification and inhibition of the growth of plants and plant parts. Thus, it is adapted to be applied to plants, plant parts and their habitats for the modification and inhibition of the growth of aquatic, terrestrial and bacterial and fungal plants. Representative habitats include cutting oils, inks, glues, paper, textiles, wood, oil and latex paints and high energy fuels.

The new compound can be prepared by reacting a 10-halophenoxarsine with an alkali metal salt of tetrahydrofurfuryl xanthic acid. The reaction conveniently is carried out in a liquid material such as acetone, benzene, water or xylene. The exact amounts of the 10-halophenoxarsine and acid salt reagents to be employed are not critical, some of the desired product being obtained when employing any proportion of ingredients. In the preferred mode of operation, about one molecular proportion of 10-halophenoxarsine is employed with one molecular proportion of the salt reagent and conveniently the sodium, potassium or ammonium salt. The reaction takes place smoothly at temperatures from 0° to 140° C. with the production of the desired product and alkali metal chloride of reaction. In carrying out the reaction, the 10-halophenoxarsine, such as 10-chlorophenoxarsine or 10-bromophenoxarsine, and alkali metal salt of the acid are mixed and contacted together in any convenient fashion and maintained for a period of time at a temperature of from 0° to 140° C. to complete the reaction. Following the completion of the reaction, the desired product can be separated and purified by conventional procedures such as filtration, decantation, washing with water and recrystallization from common organic solvents.

In a representative operation, 32.4 grams (0.15 mole) of potassium tetrahydrofurfuryl xanthate was dissolved in 200 milliliters of water and the resulting mixture added slowly portionwise with stirring to 36.1 grams (0.13 mole) of 10-chlorophenoxarsine dispersed in 300 milliliters of acetone. The addition was carried out dropwise over a period of 20 minutes and at a temperature of 15° C. During the addition, the S-(10-phenoxarsinyl) tetrahydrofurfuryl xanthate product separated in the mixture as a fluffy solid. Following the addition, stirring was continued for one hour at room temperature to insure completion of the reaction. The reaction mixture was then filtered to separate the S-(10-phenoxarsinyl) tetrahydrofurfuryl xanthate product as a crystalline solid. This product was successively recrystallized from ethanol and found to melt at 89° to 90° C.

The xanthate material employed as a starting product in accordance with the present teachings can be prepared by reacting together (1) tetrahydrofurfuryl alcohol, (2) an alkali metal hydroxide and (3) carbon disulfide. In carrying out the reaction, the tetrahydrofurfuryl alcohol and alkali metal hydroxide can be dispersed in an organic liquid as reaction medium and the carbon disulfide added thereto with stirring. Upon completion of the reaction, the desired alkali metal tetrahydrofurfuryl xanthate product can be separated from the reaction mixture by conventional methods.

The novel compound of the present invention is useful as a pesticide for the control of a number of insect and plant species. For such uses, the product can be dispersed on inert finely divided solids and employed as dusts. Such mixture also can be dispersed in water with or without the aid of surface active agents and employed as sprays. In other procedures, the product can be employed as an active constituent in inks, glues, oils, fuels, polymeric products, paper, wood, aqueous emulsions or dispersions and cooling tower and well flooding waters. In representative operations, aqueous compositions containing 500 parts per million by weight of S-(10-phenoxarsinyl) tetrahydrofurfuryl xanthate give substantially complete controls of wheat rust, coontail, nematodes and Southern army worms.

What is claimed is:
S-(10-phenoxarsinyl) tetrahydrofurfuryl xanthate.

No references cited.